United States Patent Office 3,100,500
Patented Aug. 13, 1963

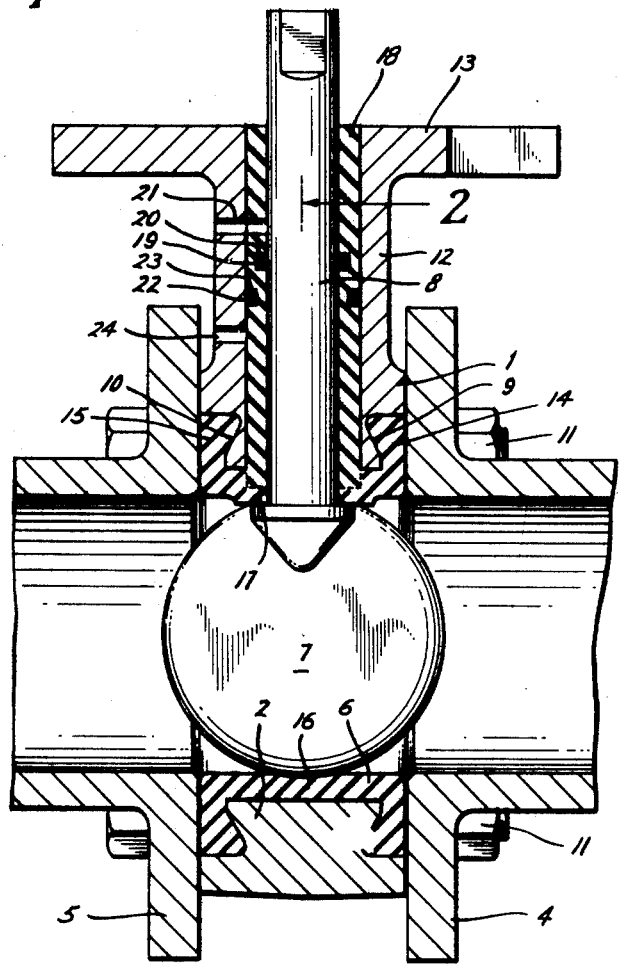

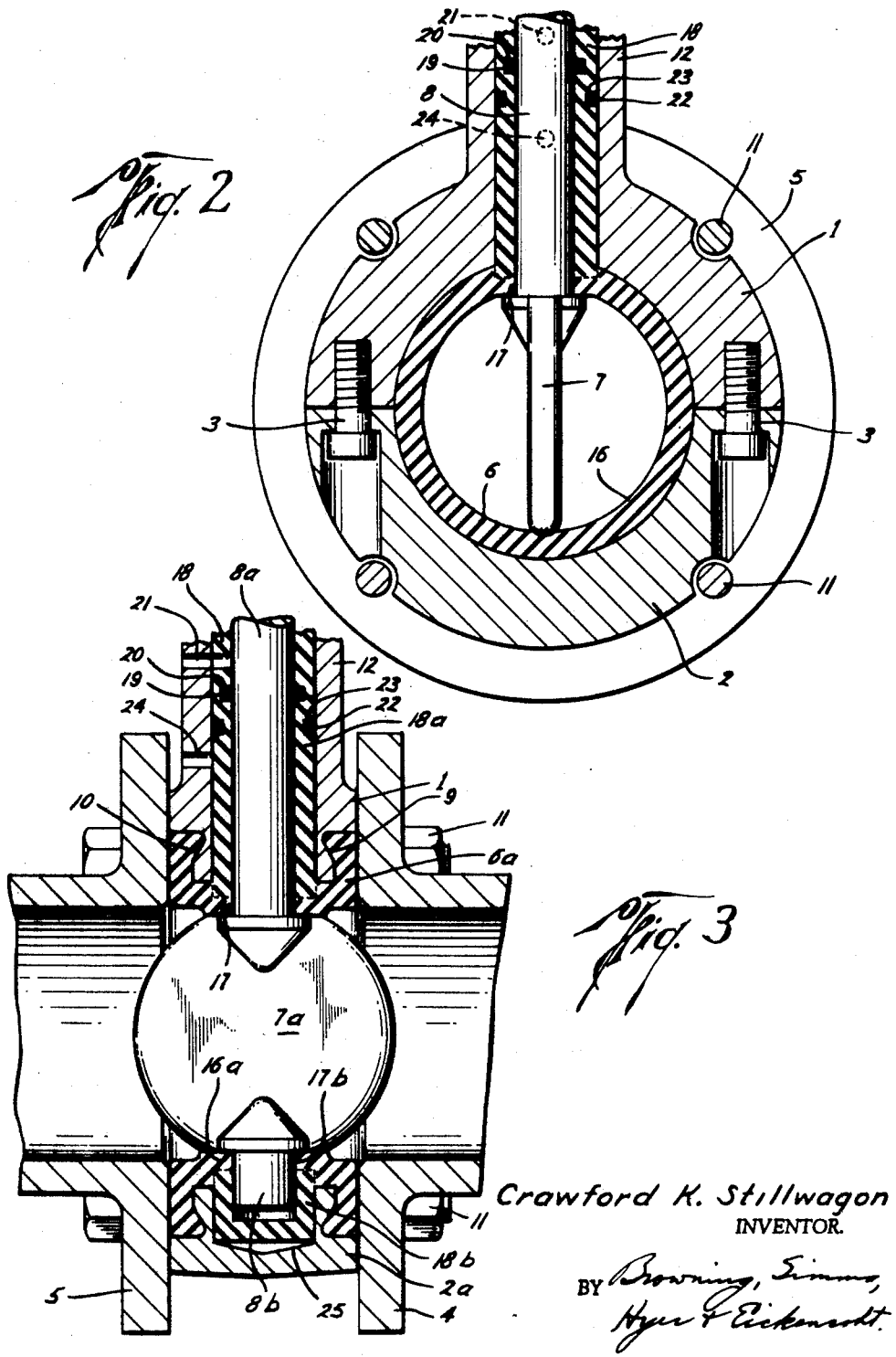

3,100,500
DISC VALVE WITH REMOVABLE SEAT AND UNITARY STEM AND DISC, AND SEAT AND STEM BUSHING UNIT THEREFOR
Crawford K. Stillwagon, 5325 Kirby Drive, Houston 5, Tex.
Filed Oct. 1, 1958, Ser. No. 764,621
12 Claims. (137—375)

This invention relates to valves and particularly to valves of the character known as butterfly or disc-type valves. Valves of this type have been known for many years for various purposes and certain improvements therein such as described and claimed in U.S. Patent No. 2,740,423 issued to Crawford K. Stillwagon on April 3, 1956, have been found highly useful and economical in pressure ranges up to approximately 150 pounds per square inch and sometimes higher and in situations involving partial vacuums such as suction lines and the like. Such modifications as illustrated in said patent are readily installed and easily maintained and the wearable parts may be replaced without disturbing the fittings which secure the valve in a conduit.

However, in certain situations, it is highly desirable that a valve of this character be available in which the parts are so constructed and arranged that the material being handled will not be afforded crevices or cracks in which such material can lodge. Particularly in this category are the handling of food products and the like in which the lodgment of such products in cracks and crevices might make cleaning and sanitation extremely difficult and in the absence of ability to completely clean the valve with ease, the growth of bacteria might be promoted and food contaminated and spoiled. Another situation is that in which a valve of this character might be employed for the handling of explosives, such as nitroglycerin, in which event the lodgment of small quantities of nitroglycerin or the like in cracks and crevices where the same could not be readily flushed out would give rise to extremely dangerous conditions.

It is, therefore, an object of this invention to provide a valve of the general character disclosed in Patent 2,740,-423 which will be suitable for the handling of explosives, foods, or other materials which involve dangers if allowed to lodge in crevices or the like within the valve.

Another object is to provide a disc-valve construction with a maximum flow passage having no crevices in which material being handled can lodge between seat insert and stem bushing or between stem and closure parts.

Another object is to provide a valve of the character described having a minimum number of parts but which may be assembled and disassembled with the greatest ease in a minimum of time.

Other objects and advantages of this invention will become apparent from the following description taken in connection with the accompanying drawings wherein are illustrated certain embodiments illustrative of this invention.

In the drawings:

FIG. 1 is a longitudinal cross-section through a valve constructed in accordance with this invention, the section being taken along the axis of the flow passage through the valve and along the axis of the stem for operating the valve and illustrating the valve member itself and the stem with which it forms a unit in elevation.

FIG. 2 is a fragmentary cross-section through the valve illustrated in FIG. 1 taken along the line 2—2 of FIG. 1.

FIG. 3 is a view similar to FIG. 1 but illustrating a modification.

In solving the problem with which this invention deals, the disc valve member and stem have been modified by making them in one integral piece either cast, forged or machined in one piece or in a number of pieces and then welded or otherwise integrally secured together to provide a unit, the surfaces of which, which are exposed to the material being handled, are continuous and free from cracks or crevices. This eliminates the necessity for two or more parts secured together by means of screws, bolts or the like within the space in which the material being handled is present so that such material might work into the crevices between such multiplicity of parts. A second modification has been the provision of a single seat member against which the disc valve member provides a seal when in closed position, which seat member has end parts that provide for sealing the valve in place and which extends continuously from one end of the valve body to the other without interruptions except such as required to pass the valve stem from the disc member to the exterior of the valve so that it can be manipulated in operating the valve. In order to prevent leakage along this stem into portions of the valve which might provide cracks or crevices between the body and moving portions of the valve, there is provided around the valve stem a tubular bushing and the end of this bushing nearest the seat above mentioned is integrally joined to the seat entirely around the opening in the seat through which the stem extends. Finally, a construction of the body was been provided in which the disc and stem unit and the seat and bushing unit may be quickly removed and separated for cleaning, repair or replacement and means has been provided for detecting any leakage which may take place out along the stem occasioned by failure of the sealing means provided for the stem.

Referring more particularly to the drawing, the valve, as illustrated in FIG. 1, comprises generally three principal parts, namely, the body which in this instance is formed of two parts 1 and 2 suitably secured together as by cap screws 3, end or flange fittings 4 and 5 and a resilient seat member 6. In addition, there is the disc closure member 7 rotatable within the seat 6 to open or close the valve by means of the stem 8 which, in accordance with this invention, is formed integrally with the valve disc member 7.

The end fittings are for the purpose of securing the valve in a conduit in the manner explained in the above-mentioned Patent No. 2,740,423 and may be of various types suitable for securing to flange connections, threaded connections, or other types of means for securing the fittings to the conduit.

The body comprising the parts 1 and 2 is formed into these two parts by a division along a plane which passes substantially through the axis of the passageway through the valve, this plane being at substantially right angles to the axis of the stem 8 by which the valve is actuated. The two parts of the body 1 and 2 are secured together in assembled relation by means of the cap screws 3 and when so secured together provide a body which is annular and which has cutaway portions 9 and 10 in its opposite end faces adjacent their innermost edges and these undercuts extend circumferentially about the valve body. In use this body is adapted to be gripped between the flanges 4 and 5 and held in such position by means of studs 11, a suitable number of which may be employed and which extend in each case through both of the flanges 4 and 5 and span the space therebetween to draw these flanges together into gripping relationship against the body 1—2.

The body part 1 in a position extending at right angles to the plane of separation between the parts 1 and 2 has a neck portion 12 extending radially away from the annular portion of the body and providing a bearing for the stem 8. At the outer end of this neck portion 12 there may be provided a flange 13 extending radially with respect to the neck portion, or any other suitable configuration adapted to cooperate with the lever, wheel, or the like to be employed as a wrench on the upper end of the stem 8.

The seat 6 likewise is annular but has radially outwardly extending flanges 14 and 15 adjacent its opposite ends, these flanges being adapted to fit into the undercut portions 9 and 10 in the body and be gripped in sealing relation thereagainst and against the flanges 4 and 5 by the clamping of the flanges against the body. This seat member 6 has the flanges 14 and 15 interconnected by a sleeve-like portion 16 which forms the actual valve seat against which the disc 7 provides a seal when it is in closed position. Except for the opening 17 required for the passage of the stem 8 from the interior of the valve to the exterior thereof, the sleeve 16 and the flanges 14 and 15 are continuous and provide an unbroken surface extending from one end of the valve body to the other, which surface is sealed to the flange fittings 4 and 5, respectively, so that no cracks or crevices are left in which material being handled may be lodged, other than the opening through which the stem 8 extends. This opening 17 is of such size as to closely embrace the stem 8 and strongly resist the entry of any material being handled in a direction leading out along the stem 8. However, in order to guard against the possibility that such material may pass into the area around the stem 8, and to prevent the material so entering from getting into cracks and crevices in other parts of the valve surrounding the stem 8, the stem 8 is surrounded by a continuous bushing 18 which is integrally bonded or otherwise joined to the seat 6 entirely around the opening 17 therein. The surfaces of the seat 6 and the bushing 18 on their interiors are continuous and free of cracks and crevices into which material being handled might be lodged. A suitable seal between the bushing 18 and the stem 8 is provided such as the O-ring 19 disposed in a groove 20 in the interior of the bushing 18 a substantial distance from the seat 6. Outwardly from this seal ring 19 there is a passage or opening 21 which may be termed a telltale opening extending from the exterior of the neck 12 of the body in through the bushing 18 to the inner surface thereof. Any leakage which might occur past the seal ring 19 along the stem 8 may be detected by its emergence through the telltale opening 21.

In similar fashion it may be desirable to provide a seal between the bushing 18 and the neck 12 at a position inwardly toward the seal 6 from the telltale opening 21, so that any leakage which might occur from the telltale opening 21 into the space between the bushing 18 and the neck 12 could be prevented from flowing into the space along the outside of the bushing 18 between it and the neck in a direction toward the annular portion of the body. Such a seal may be in the form of an O-ring 22 disposed in a groove 23 in the outer surface of the bushing 18, and any leakage past such a seal may be readily detected by providing a second telltale opening 24 inwardly from the seal 22, this telltale opening, however, passing only through the neck 12 and not through the bushing 18.

Further, in accordance with this invention, the disc valve member 7 is made integral with the stem 8 in any suitable fashion and the surfaces of these parts within the valve body are made continuous and free from cracks and crevices which might receive and furnish lodgment for material being handled.

Thus it will be seen that in the valve illustrated in FIG. 1 the only thing resembling a crack or crevice into which material being handled could possibly enter is between the bushing 18 and the stem 8, and flow out along the stem is substantially prevented by the seal ring 19 with the telltale opening 21 provided for detecting any possible leakage past this seal. Furthermore, as will presently be explained, the valve member 7 and the stem 8 may be quickly and readily removed from the body so that any material lodged between the stem and bushing may be readily and quickly cleaned out.

In the form shown in FIGS. 1 and 2 the disc 7 is supported solely by the stem 8 which extends in one direction from the disc only. This stem 8 has its axis disposed in the central plane of the disc 7 and extends from one edge of the disc in a radial direction. It provides the sole support for the disc and holds it in appropriate position and provides a means for rotating it. The disc is so sized that when in a position transversely arranged with respect to the flow passage it will slightly indent the seat 6 to substantially such an extent as illustrated in the bottom portion of FIG. 1, and will thus provide a seal against the seat 6 closing off entirely any flow through the valve.

In the modification illustrated in FIG. 3, the disc 7a has an extension of the stem 8a from its edge diametrically opposite the stem 8a as shown at 8b so that the disc is supported by an additional bearing on this stub stem part. The stub stem part 8b is likewise integrally joined to the disc 7a and the outer surfaces of these two parts are blended together so as to be continuous and leave no cracks or crevices between them into which material being handled might enter. In order to accommodate the stub stem part 8b, the seat 6a, in addition to having a bushing 18a integrally joined thereto and extending about the stem 8a, has a closed end bushing 18b secured about a second stem opening 17b in the sleeve-like portion 16a of the seat 6a. This closed end bushing 18b is integrally joined to the seat 6a around the opening 17b and its inner surface is continuous with the inner surface of the sleeve 16a and is free of cracks or crevices into which material being handled might lodge.

The lower portion 2a of the body of this valve modification differs from the lower portion 2 of the body shown in FIGS. 1 and 2 in that it is provided with a socket or opening part way therethrough as shown at 25 into which the closed end bushing 18b is adapted to fit when the parts are assembled.

It will be seen that the valve illustrated in FIG. 3 differs from that illustrated in FIGS. 1 and 2 only in the provision of the stub stem portion 8b providing additional bearing support for the disc 7a. Where additional support is found necessary for the disc, this form of valve may be preferred over that shown in FIGS. 1 and 2, but obviously it provides an additional stem and bushing portion between which material being handled might possibly collect and is, therefore, for this reason, somewhat less desirable than that shown in FIGS. 1 and 2.

In order to readily and quickly as well as thoroughly remove any material which may become lodged along the stem 8 or the stem 8a or stub stem 8b, provision is made for readily and quickly removing these parts. Such ready removal also permits quick repair and replacement when necessary.

The removal just mentioned is accomplished merely by loosening the studs 11 and removing two of them so that the valve body with its assembled parts therein may be removed laterally from between the flanges 4 and 5. Then merely by removal of the cap screws 3 the lower half 2 or 2a of the valve body may be removed, whereupon the assembly consisting of the seat and bushing unit and the disc and stem unit may be removed from the upper portion of the body. The seat, being necessarily made of flexible resilient material, may then be pulled sideways sufficiently to slip the disc and stem of FIGS. 1 and 2 downwardly and out of the bushing 18 whereupon all the parts may be cleaned thoroughly and replaced. In the case of the form shown in FIG. 3, the same is true except that the seat must be flexed downwardly so as to allow it to be removed from the stub stem 8b, and then flexed laterally to permit the removal of the disc and stem unit.

It is noteworthy that the valve just described offers no possible lodgment for material being handled other than that which might possibly get in between the stem and bushing or the stub stem and its bushing in the case of FIG. 3, and that any such material might be quickly and readily cleaned out by the process just described.

It is further noteworthy that this valve as thus constructed comprises, in addition to the flange fittings 4 and 5, only four parts, namely, the two body parts 1 and 2, the seat and bushing unit 6 and 18, and the disc and stem unit 7 and 8. These parts are easy to manufacture and handle and any one of these parts is readily replaceable when worn or damaged.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a disc valve of the type having a tubular body with annular undercut surfaces about its inner periphery at its ends, flange members having engagement with the ends of the body and providing fittings for securing the valve within a conduit, means of securing the flange members in engagement with the body ends, a disc valve member rotatably mounted within the body for controlling flow therethrough, and an annular resilient seat having end portions disposed between said undercut surfaces and said flange members and being so proportioned as to be under compression between the undercut surfaces and the flange members, respectively, and between the body and disc when the disc is in closed position, and having a circular stem-opening through one wall on an axis transverse to the axis of said annular seat and of a diameter smaller than the inner diameter of said annular seat, the improvement which comprises a stem integrally joined to said disc to form a unit and having its axis in substantially the central plane of the disc and extending laterally from one edge of the disc along an extended diameter thereof and extending radially through said stem-opening in said seat and body and rotatably mounted in said body for supporting and rotating said disc, said disc and stem unit having a continuous outer surface free from cracks and crevices within the body, said seat being sufficiently flexible to clear the portion of the disc valve member opposite the stem when the seat is out of the body and permit the integral stem and disc valve member to be inserted into and removed from the seat, and said body being in two parts separably joined together along a surface coincident with the axis of a tubular portion of said seat whereby said body may be placed around and removed from said seat while said disc valve member and stem are in place therein.

2. A disc valve in accordance with claim 1 in which said stem extends in one direction only from said disc.

3. A disc valve in accordance with claim 1 in which said stem has a stub part integrally joined to and extending radially from said disc through said seat and partly through the other of said body part in axial alignment with and in a direction opposite from the part of said stem which extends through said one body part, said stub stem part likewise having an outer surface continuous with the outer surface of said disc and free from cracks and crevices.

4. A disc valve in accordance with claim 1 in which the two parts of said body are separably joined to each other along a plane through the body axis and substantially at right angles to the axis of said stem, and means additional to said flanges for removably securing said body parts together to retain said disc and stem unit therein and detachable to permit separation of said body parts and remove said disc and stem unit.

5. A disc valve in accordance with claim 4 in which there is a tubular bushing surrounding said stem along its passage through said one body part and said bushing is bonded integrally to said seat entirely around and exteriorly of said radial opening therein to form a unit, and the surface of said unit adjacent said stem and disc is continuous and free from cracks and crevices.

6. A disc valve in accordance with claim 5 in which said one body part has a tubular bearing extending laterally therefrom and surrounding said stem and bushing and there is a telltale opening extending radially of the said tubular bearing from the exterior thereof through said bushing to the interior of the bushing for detection of leakage through said bushing along said stem, and means sealing between said bushing and stem located between said disc and said telltale opening.

7. A disc valve in accordance with claim 5 in which said one body part has a tubular bearing extending laterally therefrom and surrounding said stem and bushing and there is a telltale opening extending radially of said tubular bearing from the exterior thereof through said bushing to the interior of the bushing for detection of leakage through said bushing along said stem, means sealing between said bushing and stem located between said disc and telltale opening, and in which there is a second telltale opening extending radially of said tubular bearing from the exterior thereof to the exterior of said bushing between said first telltale opening and said seat for detection of leakage through said bearing along the exterior of said stem, and means sealing between said bushing and said bearing between said second telltale opening and said seat.

8. A disc valve in accordance with claim 5 in which said stem has a stub part integrally joined to and extending radially from said disc through said seat and partly through the other of said body part in axial alignment with and in a direction opposite from the part of said stem which extends through said one body part, said stub stem part likewise having an outer surface continuous with the outer surface of said disc and free from cracks and crevices and a closed end bushing surrounding and completely enclosing said stub stem outwardly of said seat and bonded integrally to said seat entirely around said stub stem to form a unit with said tubular bushing and said seat, and the surface of said unit adjacent said stub stem and disc is continuous and free from cracks and crevices.

9. A valve seat and stem bushing unit for a disc-type valve comprising a tubular resilient seat having radially outwardly turned end flanges adapted to be sealed to the ends of a valve body in which the seat may be mounted and having a sleeve-like portion extending between said end flanges and adapted to be disposed in such valve body and form a seal about a valve disc therein when the disc is in closed position, said sleeve-like part having a circular radial opening therethrough of lesser diameter than the distance between said end flanges to permit passage of a stem for holding and rotating a valve disc disposed in the sleeve, and a tubular bushing for such stem bonded integrally to said seat entirely around and exteriorly of said radial opening to form a unit, said bushing extending imperforate radially outwardly from said seat beyond the outer extremities of said flanges and having a stem opening therethrough in alignment with and a part in said opening of substantially the same inner diameter as said radial opening to embrace and seal about such stem, and such bushing having its exterior surfaces which are disposed between said flanges spaced from said flanges, the surface of said unit within said sleeve and bushing and the joinder thereof being continuous and free from cracks and crevices.

10. A valve seat and stem unit in accordance with claim 9 in which said sleeve-like part has an unbroken inner surface except for said radial opening.

11. A valve seat and stem unit in accordance with claim 9 in which said sleeve-like part has a second circular radial opening therethrough of lesser diameter than the distance between said end flanges in axial alignment with and directly opposite said first radial opening to receive a stub stem part and a closed end bushing surrounding said second radial opening exteriorly of said seat and bonded integrally to said seat entirely around and exteriorly of said second radial opening to form a unit with said seat and tubular bushing, said closed end bushing having a stem-opening partly therethrough in alignment with said second radial opening and having an external diameter less than the distance between said flanges, the surface of said unit within said seat and bushings and the joinder thereof being continuous and free from cracks and crevices.

12. In a disc valve of the type having a tubular body with annular undercut surfaces about its inner periphery at its ends, flange members having engagement with the ends of the body and providing fittings for securing the valve within a conduit, means for securing the flange members in engagement with the body ends, a disc valve member rotatably mounted within the body for controlling flow therethrough, and an annular resilient seat having end portions disposed between said undercut surfaces and said flange members and being so proportioned as to be under compression between the undercut surfaces and the flange members, respectively, and between the body and disc when the disc is in closed position, and having a circular stem-opening through one wall on an axis transverse to the axis of said annular seat and of a diameter smaller than the inner diameter of said annular seat, the improvement which comprises a stem integrally joined to said disc to form a unit and having its axis nondivergent from the central plane of the disc and extending laterally from the disc and through said stem-opening in said seat and body and rotatably mounted in said body for rotatably supporting said disc, said disc and stem unit having a continuous outer surface free from cracks and crevices within the body, said seat being sufficiently flexible to clear the portion of the disc valve member opposite the stem when the seat is out of the body and permit the integral stem and disc valve member to be inserted into and removed from the seat, and said body being in two parts separably joined together along a surface coincident with the axis of a tubular portion of said seat whereby said body may be placed around and removed from said seat while said disc valve member and stem are in place therein.

References Cited in the file of this patent

UNITED STATES PATENTS

| | | |
|---|---|---|
| 299,734 | Callahan | June 3, 1884 |
| 955,948 | Davis | Apr. 26, 1910 |
| 1,242,621 | Watkins | Oct. 9, 1917 |
| 1,848,369 | Mohr | Mar. 8, 1932 |
| 1,898,935 | Brandriff | Feb. 21, 1933 |
| 1,927,550 | Kishline | Sept. 19, 1933 |
| 2,054,369 | Francis | Sept. 15, 1936 |
| 2,194,262 | Allen | Mar. 19, 1940 |
| 2,329,315 | Allen | Sept. 14, 1943 |
| 2,740,423 | Stillwagon | Apr. 3, 1956 |
| 2,817,489 | Hesmer | Dec. 24, 1957 |
| 2,884,224 | Fawkes | Apr. 28, 1959 |
| 2,900,995 | Dickerson | Aug. 25, 1959 |

FOREIGN PATENTS

| | | |
|---|---|---|
| 922,800 | Germany | Jan. 24, 1955 |